United States Patent Office 3,562,342
Patented Feb. 9, 1971

3,562,342
ISOMERIZATION OF ALKYL AROMATICS
Gayle P. Hebert, Port Neches, and Jerry C. Perciful, Groves, Tex., assignors to Texaco Inc., New York, N.Y., a corporation of Delaware
No Drawing. Filed Nov. 27, 1968, Ser. No. 779,612
Int. Cl. C07c 15/02, 15/08
U.S. Cl. 260—668
11 Claims

ABSTRACT OF THE DISCLOSURE

A process for the isomerization of alkyl aromatic streams under hydroisomerization conditions using a catalyst comprising nickel and tungsten as the metals or sulfides, and a mixture of a decationized crystalline zeolite and an amorphous inorganic oxide.

---

This invention relates to the isomerization of alkylated aromatic hydrocarbons. In a particularly desirable embodiment, this invention is directed to the production and recovery of xylene isomers by the catalytic isomerization of $C_8$ alkyl aromatic hydrocarbons.

Heretofore, aromatic hydrocarbons containing the isomers ortho-, meta-, and paraxylene along with ethylbenzene were extensively used as octane builders in gasoline. More recently, interest has arisen in the methylated isomers as valuable raw materials in, for example, the production of benzene carboxylic acids. With regard to paraxylene, its importance as a chemical building block has prompted widespread demand such that existing sources are straining to maintain adequate supply. The greater demand for paraxylene has arisen by virtue of its being a precursor for polyester fibers and resins through the intermediate terephthalic acid and dimethyl terephthalate. In view of this increasing demand various processes have been proposed whereby paraxylene is prepared by isomerizing under catalytic conditions $C_8$ aromatic streams. Notwithstanding the process advances made in the catalytic isomerization of $C_8$ aromatic streams to provide increased production of the desired paraisomer the demand continues to exist for more efficient processes and catalysts for the production thereof wherein alkyl aromatic feed streams can be substantially converted to paraxylene with minimal by-product formation.

While increasing the availability of paraxylene is, of course, of prime consideration a further demand exists for versatile processes and catalysts which are capable of providing any one of the selected xylene isomers in response to market demands. As we have mentioned above the presently expanding requirements of paraxylene for polyester fibers are causing strain on existing facilities. Similarly, ortho- and metaxylenes are also valuable precursors for acid anhydrides and dicarboxylic acids which may be converted to diester type plasticizers and lubricants. As such, a valuable isomerization process and catalyst would be one permitting the xylene isomerizer to provide and recover any one of the three xylene isomers depending upon the prevailing market conditions. Moreover, the xylene isomer should be provided in high purities of, for example, at least 95 weight percent.

It is, therefore, an object of this invention to provide a process for upgrading hydrocarbon fractions.

Another object of this invention is to provide a process for the production of ortho-, meta-, or paraxylene by employing a novel xylene isomerization catalyst.

Yet another object of this invention is to provide a process for the isomerization of non-equilibrium $C_8$ aromatics by employing a novel and highly active composite as catalyst therefor.

Other objects and advantages would become apparent from a reading of the following detailed description and examples.

Broadly, this invention contemplates a process for the isomerization of alkyl aromatic hydrocarbons which comprises contacting said hydrocarbon under hydroisomerization conditions with a composite isomerization catalyst comprising (a) nickel and tungsten and (b) a cracking component composed of a mixture of inorganic oxides in amphorous form and a synthetic crystalline zeolite, said zeolite being present in the mixture in an amount between 5 and 55 percent based on the weight of the cracking component.

As provided above the composite catalyst employed in the process of the present invention comprises a combination of hydrogenation components, a crystalline aluminosilicate and a mixture of inorganic oxides in amphorous form. The combination of hydrogenating components comprises nickel and tungsten present as the metal or sulfide.

The crystalline alumina-silicate component comprises a modified synthetic or natural zeolite. Zeolites are considered to be a three-dimensional frame-work of silica and alumina tetrahedra which are closely linked by the sharing of oxygen atoms. Zeolites are generally represented by the formula:

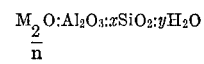

where M is a cation, $n$ represents the valence of the cation, $x$ represents the moles of silica and $y$ the moles of water. Zeolites which may be modified to perform satisfactorily in the process of the present invention include naturally occurring zeolites such as mordenite, analcite, clinoptilolite and chabazite. Synthetic zeolites such as Zeolite X, Zeolite Y, Zeolite A and Zeolite D may also be used to advantage. However, Zeolite Y which is represented by the formula $0.9\pm0.2Na_2:Al_2O_3:xSiO_2:yH_2O$ where $x$ is from 3 to 6 and $y$ is from 0 to 9 is preferred as the starting material because of the high activity of the catalyst prepared therefrom. Zeolite Y is particularly desirable as a starting material because catalyst prepared therefrom have high steam and thermal stability. These latter properties are attractive in that the catalyst made from Zeolite Y may be subjected to steam and high temperatures during regeneration and yet does not collapse but retains its crystallinity to a much greater extent than catalyst prepared from other zeolites.

In one embodiment of the present invention, the zeolite forming a component of the instant catalyst is modified to the extent that a considerable portion of the alkali metal is substituted by a hydrogen ion or an ion which is convertible to hydrogen as for example ammonium. The metal ion of the zeolite is replaced by the positive hydrogen or ammonium ion by means of ion exchange. Suitably this is done by contacting the zeolite with an aqueous solution of an organic or inorganic acid or an ammonium compound. Suitable acids includes hydrochloric acid, sulfuric acid, nitric acid, sulfurous acid, acetic acid, oxalic acid, propionic acid, benzoic acid and the like. The ammonium ion may be supplied from nitrogen-containing compounds such as ammonium chloride, ammonium sulfate, ammonium sulfide, methylamine and the like.

For the removal of more than about 70 percent of the metal e.g. sodium ion from the zeolite, inasmuch as zeolites tend to decompose in a medium having a pH below about 2.5 to 4 depending on the zeolite, it is desirable to resort to ammonium ion exchange rather than acid treatment to achieve substantially complete removal of the metal. The zeolite is then calcined to drive off ammonia and obtain the zeolite in the hydrogen form.

As mentioned earlier, the contemplated alkyl aromatic isomerization catalyst comprises, in addition to nickel, tungsten and zeolite, an inorganic oxide in amorphous form. The oxide may be an oxide of the metals of group I–B, II, III, IV, V, VI, VII and VIII of Periodic System preferably an oxide of the group II–A, III–A or IV–A metal or a mixture thereof. Preferred inorganic oxides comprise silica, alumina, magnesia or zirconia or mixtures thereof. Advantageously the amorphous inorganic oxide has substantially the same chemical composition as the crystalline zeolite, namely silica-alumina.

Ordinarily, the combined hydrogenating components are added to the crystalline alumina-silicate. Preferably this is done by contacting the zeolite component with a solution of a compound containing the metal of the hydrogenating component. The hydrogenating component may be deposited by draining any excess solution from the zeolite and drying. Ordinarily, the catalyst is then calcined in an oxidizing atmosphere. By this procedure the hydrogenating component will be in the form of the oxide deposited on the zeolite component. The hydrogenating component may also be incorporated into the zeolite component by means of ion exchange using a solution of a salt of a metal of the hydrogenating component. A hydrogenating component may also be incorporated directly into the alkali metal form of the zeolite by means of ion exchange with a soluble salt, for example, the chloride of the metal of the hydrogenating component, the alkali metal chloride formed by the exchange of ion being removed from the reaction zone.

The combining hydrogenating components generally are present in an amount between about 3 and 50 weight percent of the total catalyst composite and preferably between 5 and 35 weight percent. In a highly preferred embodiment the catalyst is composed of approximately 6 weight percent nickel and 19 weight percent tungsten calculated as the metal. The zeolite component is present in an amount between 5 and 55 weight percent based on the weight of the cracking component and the amorphous inorganic oxides constitute the remainder. Preferably the zeolite is Zeolite Y and the inorganic oxide is silica-alumina.

In a highly referred embodiment, the combined hydrogenating components are employed as the metal. When it is desired to prepared the catalyst in the metallic form from the metal oxides, the catalyst may be contacted with a stream of hydrogen at temperatures of from 600° F. to 1100° F. for periods ranging from 2 to 100 hours. When the sulfide form is desired the catalyst may be contacted with a stream containing a sulfiding agent such as carbon disulfide, hydrogen sulfide, or other similar sulfur containing compounds at temperatures of from 400° F. to 600° F. for periods of 10 to 200 hours. Advantageously, the sulfiding agent is diluted with a material such as hydrogen, nitrogen, flue gas, hydrocarbons including benzene, toluene, mixtures or pure isomers of $C_8$ aromatics, and the like.

The conditions employed in the isomerization zone generally entail carrying out the reaction at temperatures of from 600 and 1000° F. under pressures of from 50 to 500 pounds per square inch gauge with space velocities ranging from 1 to 10 volumes of liquid isomerization feed per volume of catalyst per hour and a hydrogen to hydrocarbon mole ratio ranging from 1:1 and 20:1. Preferably, the process is carried out at temperatures of from 650 and 950° F. under pressures of from 100 to 300 pounds per square inch gauge at space velocities of from 1 to 4 volumes of liquid hydrocarbon charge per volume of catalyst per hour and a hydrocarbon mole ratio of from 3:1 to 15:1. In copending application Ser. No. 762,450, filed Sept. 25, 1968 entitled Xylene isomerization Process by Gayle P. Hebert et al. and assigned to the assignee hereof, there is described and claimed a highly preferred process for isomerizing alkyl aromatic streams and is hereby incorporated by reference. Other generally known processing schemes may similarly be employed to advantage by utilizing the isomerization catalyst herein presented.

The catalyst mentioned above and employed for the isomerization of alkyl aromatics can easily be regenerated by employing conventional procedures to remove carbon deposited therein as by, for example, exposing the catalysts to an oxygen-containing gas at temperatures of from 850 to 1050° F. for a period of time of from 12 to 200 hours sufficient to burn carbon off of the catalyst.

In order to more fully illustrate the nature of this invention, the following examples are presented.

EXAMPLE I 16,000 grams of commercially purchased sodium Zeolite Y are slurried in a solution containing 12,000 grams ammonium sulfate and 60 liters of water for 2 hours at 200° F. and then filtered. This ion exchange procedure is repeated twice with fresh ammonium sulfate solutions and the resulting zeolite wash clear of sulfate ion and then dried at 300° F.

3,492 grams of the decationized zeolite is calcined at 1,000° F. for 3 hours with a product recovery of 3,318 grams. The calcined zeolite is then further ion exchanged with a solution containing 6,000 grams of ammonium sulfate in 120 liters of water for 2 hours at 200° F. and then filtered. This procedure is repeated once and the filter cake washed free of sulfate, dried and then calcined at 1500° F. for 3 hours. The product analysis is 0.23 weight percent $Na_2O$, 16.5 weight percent $Al_2O_3$, 63.7 weight percent $SiO_2$ and has a surface area of 608 m.$^2$/gram.

400 grams of the calcined decationized zeolite is thoroughly mixed with 15,180 grams of solution containing 7.9 percent solids, the solids being a cracking catalyst filter cake of 75 weight percent silica and 24 weight percent alumina. The mixture is filtered, dried at 300° F. and then calcined at 1,000° F. with a loss on ignition of 11.2 percent.

585 grams of the dried material is sieved through 20 mesh screen and then mixed with a solution containing 238 grams nickel nitrate and 217 grams ammonium metatungstate in 350 milliliters of water. The mixture is dried on a steam plate and, after the addition of 5 weight percent hydrogenated vegetable oil, is pilled and the resulting catalyst is dried with air at 700° F. for 4 hours and calcined at 1,000° F. for 4 hours. The catalyst contains 7.6 percent nickel oxide, 20.3 percent tungsten oxide, 18.1 percent Zeolite Y and 54.0 percent silica-alumina on a weight percent basis.

EXAMPLE II

A catalyst prepared by the procedure outlined in Example I and containing 7.5 weight percent nickel oxide, 22.3 weight percent tungsten oxide, 15.4 weight percent Zeolite Y, and 54.8 weight percent silica-alumina is treated with hydrogen at 900° F. 200–300 p.s.i.g., for 4 hours to reduce the metal oxides to the metallic states. The catalyst is now composed of 5.9 weight percent nickel, 19.0 weight percent tungsten, 16.5 weight percent Zeolite Y, and 58.6 weight percent silica-alumina.

EXAMPLE III

A liquid feed stock containing 22.8 weight percent toluene, 43.0 weight percent $C_8$ aromatics and 34.1 weight percent 1,2,4-trimethylbenzene as shown in Table I was charged to an isomerization reactor containing the reduced nickel-tungsten isomerization catalyst prepared in Example II. The feed was isomerized under the following isomerization conditions: 908° F., 300 p.s.i.g., 1.6 LHSV and a hydrogen to hydrocarbon mole ratio of 3.3. As can be seen from Table I the $C_8$ aromatic recovery was 109.2 weight percent where a portion of the $C_7$ and $C_9$ materials were converted to desirable $C_8$ aromatics. The paraxylene percent of the equilibrium of the $C_8$ aromatic product liquid was 73.6 percent.

EXAMPLE IV

A catalyst prepared as in Example I and composed of 7.5 weight percent nickel oxide, 22.3 weight percent tungsten oxide, 15.4 weight percent Zeolite Y, and 54.8 weight percent silica-alumina is sulfided by contacting with a stream of mixed $C_8$ aromatics containing 1.0 weight percent carbon disulfide at 400° F. in the presence of hydrogen until a copious breakthrough of hydrogen sulfide is observed, usually after about 4–20 hours. The temperature is increased at 100° F./hr. to 600° F. and held at 600° F. for 4 hours while continuing the flow of hydrogen, carbon disulfide, and $C_8$ aromatics mixture. The catalyst is now composed of 8.3 weight percent nickel sulfide, 23.3 weight percent tungsten sulfide, 15.0 weight percent Zeolite Y, and 53.4 weight percent silica-alumina A liquid feed stock containing 1.1 weight percent benzene, 7.1 weight percent toluene, 79.9 weight percent $C_8$ aromatics, 34.1 weight percent 1,2,4-trimethyl-benzene and 6.0 weight percent non-aromatic hydrocarbons, as shown in Table I was charged to an isomerization reactor containing the sulfided nickel-tungsten isomerization catalyst prepared as in Example IV. The feed was isomerized under the following isomerization conditions. 855° F., 200 p.s.i.g., 3.0 LHSV, and a hydrogen to hydrocarbon mole ratio of 10.4. As can be seen from Table I the $C_8$ aromatic recovery was 93.3 weight percent. The paraxylene percent of the equilibrium of the $C_8$ aromatic product liquid was 78.8 percent.

TABLE I

| | Example | | | |
|---|---|---|---|---|
| | III | | IV | |
| | Feed I | Product | Feed II | Product |
| Liquid composition, wt. percent: | | | | |
| Non-aromatics | 0.0 | 2.8 | 6.0 | 8.0 |
| Benzene | 0.1 | 0.6 | 1.1 | 1.5 |
| Toluene | 22.8 | 19.7 | 7.1 | 8.1 |
| Ethylbenzene | 4.4 | 4.4 | 7.0 | 6.6 |
| p-Xylene | 3.7 | 7.3 | 7.6 | 12.5 |
| m-Xylene | 24.5 | 23.5 | 45.4 | 38.7 |
| o-Xylene | 10.4 | 12.2 | 19.3 | 17.4 |
| Heavy Aromatics ($C_{9+}$) | 34.1 | 29.5 | 6.5 | 7.2 |
| Total | 100.0 | 100.0 | 100.0 | 100.0 |
| Percent $C_8$ in liquid | 43.0 | 47.4 | 79.3 | 75.2 |
| $C_8$ aromatic recovery, wt. percent basis $C_8$ in feed | | 109.2 | | 93.3 |
| Percent p-Xylene in $C_8$ fraction | 8.6 | 15.4 | 9.6 | 16.7 |
| Percent p-Xylene equilibrium in $C_8$ fraction | | 73.6 | | 78.8 |
| Total liquid recovery, wt. percent | | 99.0 | | 98.4 |

We claim:
1. A process for the isomerization of alkyl aromatic hydrocarbons which comprises contacting said hydrocarbon under hydroisomerization conditions with a composite isomerization catalyst comprising (a) nickel and tungsten and (b) a cracking component composed of a mixture of inorganic oxides in amorphous form and a synthetic crystalline zeolite in hydrogen form, said nickel and tungsten being present in an amount of from 3 to 50 weight percent of said catalyst, said zeolite being present in the cracking component in an amount between 5 and 55 percent based on the weight of the cracking component.

2. A process according to claim 1 wherein said nickel and tungsten are present as metals.

3. A process according to claim 1 wherein said nickel and tungsten are present as sulfides.

4. A process according to claim 1 wherein said nickel and tungsten are present in an amount of from 5 to 35 weight percent of said catalyst.

5. A process according to claim 1 wherein said zeolite in Zeolite Y.

6. A process according to claim 1 wherein said inorganic mixture comprises silica-alumina.

7. A process according to claim 1 wherein said isomerized alkyl aromatic is paraxylene.

8. A process according to claim 1 wherein said isomerized alkyl aromatic is metaxylene.

9. A process according to claim 1 wherein said isomerized alkyl aromatic is orthoxylene.

10. A process according to claim 1 wherein said hydrocarbon is contacted with said catalyst under hydroisomerization conditions of 600 to 1,000° F., at pressures of from 50 to 500 pounds per square inch gauge, at space velocities of from 1 to 10 volumes of hydrocarbon per volume of catalyst per hour and a hydrogen to hydrocarbon mole ratio of from 1:1 to 20:1.

11. The process of claim 1 in which the catalyst consists essentially of nickel, tungsten, hydrogen, silica and alumina.

References Cited
UNITED STATES PATENTS

| 3,120,569 | 2/1964 | Egan | 260—668 |
|---|---|---|---|
| 3,146,276 | 1/1964 | Nevitt | 260—683.65 |
| 3,119,886 | 1/1964 | Smeykal et al. | 260—668 |
| 3,177,159 | 4/1965 | Rodgers et al. | 260—683.65 |
| 3,370,099 | 2/1968 | Plank et al. | 260—683.65 |

CURTIS R. DAVIS, Primary Examiner